United States Patent
Min et al.

(10) Patent No.: US 11,005,118 B2
(45) Date of Patent: May 11, 2021

(54) SOLID ELECTROLYTE SHEET FOR ALL-SOLID BATTERY, A METHOD OF MANUFACTURING SAME, AND AN ALL-SOLID BATTERY INCLUDING SAME

(71) Applicants: HYUNDAI MOTOR COMPANY, Seoul (KR); KIA MOTORS CORPORATION, Seoul (KR); INDUSTRY-UNIVERSITY COOPERATION FOUNDATION HANYANG UNIVERSITY, Seoul (KR)

(72) Inventors: Hong Seok Min, Yongin-si (KR); Yong Sub Yoon, Seoul (KR); O Min Kwon, Busan (KR); Pil Gun Oh, Daejeon (KR); Dong Wook Shin, Seongnam-si (KR); Sung Woo Noh, Seoul (KR)

(73) Assignees: HYUNDAI MOTOR COMPANY, Seoul (KR); KIA MOTORS CORPORATION, Seoul (KR); INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 202 days.

(21) Appl. No.: 15/842,059

(22) Filed: Dec. 14, 2017

(65) Prior Publication Data
US 2018/0183084 A1    Jun. 28, 2018

(30) Foreign Application Priority Data

Dec. 28, 2016    (KR) .................. 10-2016-0181656

(51) Int. Cl.
*H01M 8/1016*    (2016.01)
*H01M 8/1286*    (2016.01)
(Continued)

(52) U.S. Cl.
CPC ......... *H01M 8/1016* (2013.01); *H01M 8/124* (2013.01); *H01M 8/1286* (2013.01);
(Continued)

(58) Field of Classification Search
CPC ... H01M 8/124; H01M 8/1016; H01M 8/1286
See application file for complete search history.

(56) References Cited

U.S. PATENT DOCUMENTS 9,029,023 B2    5/2015    Choi
9,580,320 B2    2/2017    Inda
(Continued)

FOREIGN PATENT DOCUMENTS

CN    1949569 A    4/2007
CN    103094643 A    5/2013
(Continued)

*Primary Examiner* — Karie O'Neill Apicella
(74) *Attorney, Agent, or Firm* — Lempia Summerfield Katz LLC

(57) ABSTRACT

A solid electrolyte sheet for all-solid batteries has a carrier film including poly (methyl methacrylate) and an ionic conductive material, and has a solid electrolyte slurry coated on the carrier film. The solid electrolyte sheet and an all-solid battery including such a solid electrolyte sheet can realize formation of a solid electrolyte layer as a thin film and can prevent a short-circuit upon stacking a positive electrode and a negative electrode. The solid electrolyte sheet and the all-solid battery can prevent yield decrease resulting from a short-circuit of the all-solid battery and can minimize supernumerary pores due to ionic conductive material incorporated into the solid electrolyte layer to suppress formation of lithium dendrites.

10 Claims, 3 Drawing Sheets

(51) Int. Cl.
*H01M 8/124* (2016.01)
*H01M 10/056* (2010.01)
*H01M 10/052* (2010.01)
*H01M 10/0585* (2010.01)

(52) U.S. Cl.
CPC ........ H01M 10/052 (2013.01); H01M 10/056 (2013.01); H01M 10/0585 (2013.01); *H01M 2300/0068* (2013.01); *H01M 2300/0082* (2013.01); *H01M 2300/0091* (2013.01); *H01M 2300/0094* (2013.01); *Y02E 60/50* (2013.01); *Y02P 70/50* (2015.11)

(56) References Cited

U.S. PATENT DOCUMENTS

| | | |
|---|---|---|
| 9,680,191 B2 | 6/2017 | Lee |
| 2003/0180623 A1 | 9/2003 | Yun |
| 2007/0087269 A1 | 4/2007 | Inda |
| 2013/0040206 A1 | 2/2013 | Yoshida et al. |
| 2013/0108934 A1 | 5/2013 | Lee |
| 2013/0260257 A1 | 10/2013 | Choi |
| 2014/0004257 A1 | 1/2014 | Kubo et al. |
| 2014/0234726 A1 | 8/2014 | Christensen |
| 2016/0268638 A1 | 9/2016 | Jang |
| 2017/0214051 A1* | 7/2017 | Yoon ................. H01M 4/364 |

FOREIGN PATENT DOCUMENTS

| | | | | |
|---|---|---|---|---|
| CN | 103367798 A | 10/2013 | | |
| CN | 103872377 A | 6/2014 | | |
| CN | 105594051 A | 5/2016 | | |
| CN | 105977532 A | 9/2016 | | |
| JP | 2005085638 A | 3/2005 | | |
| JP | 2012069248 | 4/2012 | | |
| JP | 2012069248 A * | 4/2012 | ........ | H01M 10/0525 |
| KR | 1020130056204 | 5/2013 | | |
| KR | 20160071201 A * | 6/2016 | ......... | H01M 10/052 |
| KR | 101637775 | 7/2016 | | |

\* cited by examiner

SOLID ELECTROLYTE SHEET FOR ALL-SOLID BATTERY, A METHOD OF MANUFACTURING SAME, AND AN ALL-SOLID BATTERY INCLUDING SAME

CROSS-REFERENCE TO RELATED APPLICATION

This application claims, under 35 U.S.C. § 119, the benefit of priority to Korean Patent Application No. 10-2016-0181656 filed on Dec. 28, 2016, the entire contents of which are incorporated herein by reference.

BACKGROUND

(a) Technical Field

The present disclosure relates to a solid electrolyte sheet for all-solid batteries, a method of manufacturing an all-solid electrolyte sheet, and an all-solid battery including an all-solid electrolyte sheet.

(b) Background Art

Secondary batteries such as lithium batteries are increasingly utilized in a variety of applications including portable information terminals, portable electronic devices, vehicles, electric vehicles and hybrid electric vehicles. Demand for solid state or all-solid batteries is increasing because it is more effective to use inorganic solid electrolytes, instead of organic solvent electrolytes, which readily ignite upon leakage due to high flammability, in order to achieve or improve safety of secondary batteries.

In other words, an all-solid battery refers to a battery, which includes a solid electrolyte instead of a polymer electrolyte liquid in a conventional battery configuration. An all-solid battery can solve safety problems such as leakage or ignition while also offering chemical stability. The all-solid battery has no separation membrane-type element for preventing electric short-circuit between a positive electrode and a negative electrode due to configuration features thereof. In addition, in fabricating all-solid batteries, problems occur such as difficulty in stacking a thin solid electrolyte layer due to a non-uniform electrode surface and in decreased yield due to short-circuiting between a positive electrode and a negative electrode. Furthermore, it is difficult to realize or achieve a thin solid electrolyte layer with a solid electrolyte stack coating used for conventional methods of fabricating all-solid batteries.

The above information disclosed in this Background section is only to enhance understanding of the background of the disclosure. Therefore, the Background may contain information that does not form the related art that is already known in this country to a person of ordinary skill in the art.

SUMMARY OF THE DISCLOSURE

The present disclosure has been made in an effort to solve the above-described problems associated with the related art.

The present disclosure is directed to providing a solid electrolyte sheet for all solid batteries that can maintain ionic conductivity of solid electrolyte layers, realize formation of a solid electrolyte layer as a thin film, and prevent short-circuit upon stacking a positive electrode and a negative electrode. The disclosure is also directed to providing an all-solid battery including such a solid electrolyte sheet.

In one aspect, the present disclosure provides a solid electrolyte sheet for all-solid batteries. The solid electrolyte sheet has a carrier film including poly (methyl methacrylate) and an ionic conductive material, and has a solid electrolyte slurry coated on the carrier film.

The ionic conductive material may be a compound including $Li_2S$—$P_2S_5$, preferably $Li_6PS_5X$ (X=Cl or Br).

In addition, the solid electrolyte slurry may be coated on one or both surfaces of the carrier film. The solid electrolyte slurry may include a solid electrolyte, a nitrile-butadiene rubber binder and an organic solvent.

The solid electrolyte slurry may be coated to 20 to 40 μm (about 0.0008 to 0.0016 in).

In another aspect, the present disclosure provides a method of manufacturing an all-solid battery. The method includes stacking a positive electrode current collector, a positive electrode layer, the solid electrolyte sheet manufactured by the method according to the present disclosure, a negative electrode layer, and a negative electrode current collector to produce an all-solid battery. The method further includes drying the all-solid battery at a pressure of 3 to 7 tons (6,000 to 14,000 psi), and at a temperature of 80 to 120° C. (176 to 248° F.) for 30 minutes to 3 hours.

Other aspects and embodiments of the disclosure are discussed herein below.

BRIEF DESCRIPTION OF THE DRAWINGS

The above and other features of the present disclosure are now described in detail with reference to certain embodiments, which are illustrated in the accompanying drawings and which are given hereinbelow by way of illustration only. The accompanying drawings thus are not intended to limit the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, like reference numbers refer to the same or equivalent parts of the present disclosure throughout the several figures of the drawings.

DETAILED DESCRIPTION

Hereinafter, reference is made in detail to various embodiments of the present disclosure, examples of which are illustrated in the accompanying drawings and described below. While the disclosure includes certain embodiments, it will be understood that the present description is not intended to limit the disclosure to only the embodiments shown and described. On the contrary, the disclosure is intended to cover not only the disclosed embodiments, but also various alternatives, modifications, equivalents and other embodiments, which may be included within the spirit and scope of the disclosure as defined by the appended claims. In the following description of the present disclosure, detailed descriptions of known functions and configurations incorporated herein will be omitted when it may obscure the subject matter of the present disclosure.

The present disclosure shows and describes a solid electrolyte sheet for solid state or all-solid batteries. The solid electrolyte sheet has a carrier film including poly (methyl methacrylate) and an ionic conductive material. The solid electrolyte sheet also has a solid electrolyte slurry coated on the carrier film.

In addition, in another aspect, the present disclosure provides a method of manufacturing an all-solid battery. The method includes stacking a positive electrode current collector, a positive electrode layer, the solid electrolyte sheet manufactured by the method according to the present disclosure, a negative electrode layer and a negative electrode current collector to produce an all-solid battery. The method further includes drying the all-solid battery at a pressure of 3 to 7 tons (6,000 to 14,000 psi), and at a temperature of 80 to 120° C. (176 to 248° F.) for 30 minutes to 3 hours.

Hereinafter, a solid electrolyte sheet for all-solid batteries, a method of manufacturing such a solid electrolyte sheet, and an all-solid battery including such a solid electrolyte sheet according to specific embodiments of the present disclosure are described in more detail.

Figure 1:
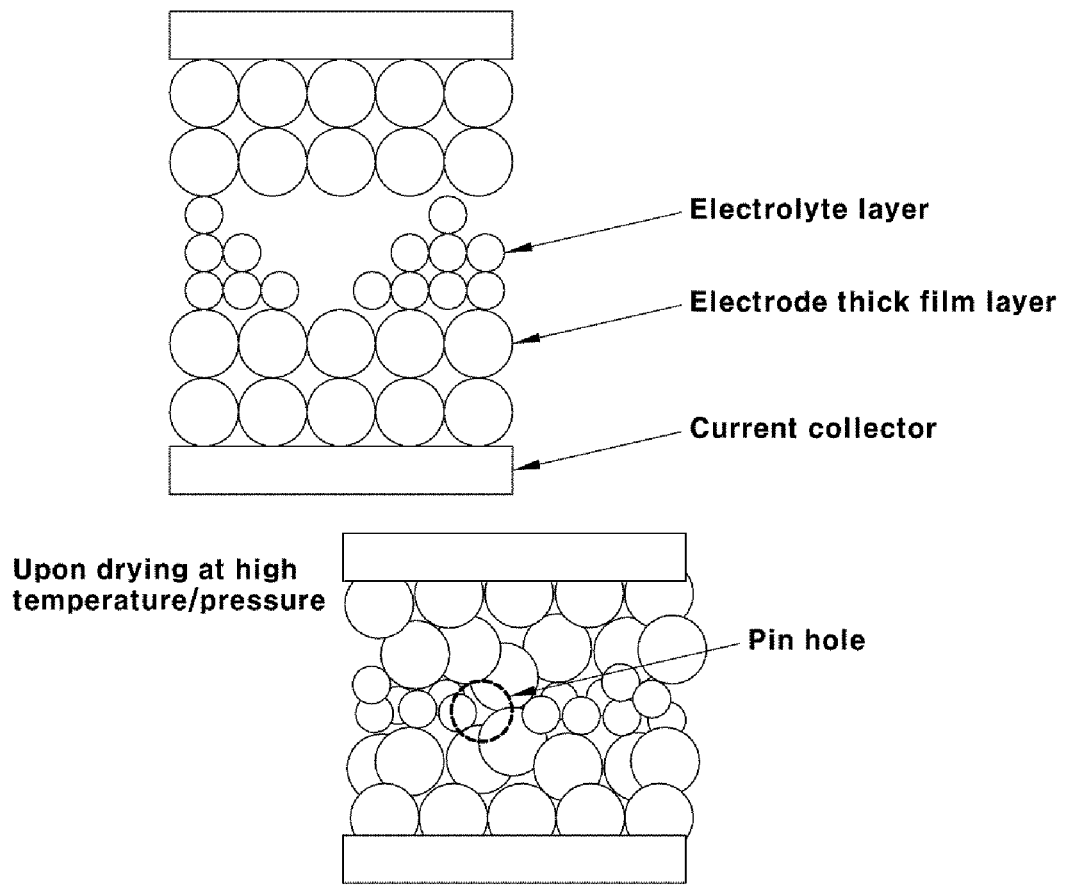
FIG. 1 shows the formation of pinholes when drying a conventional all-solid battery at high pressure and high temperature.

Conventional solid state or all-solid batteries have problems such as difficulty in stacking a thin solid electrolyte layer due to non-uniform electrode surface and decreased yield due to a short-circuit between a positive electrode and a negative electrode. In addition, as shown in FIG. 1, conventional all-solid batteries also have another problem in that pinholes are formed upon drying at high pressure and high temperature. FIG. 1 shows the formation of pinholes when drying a conventional all-solid battery at high pressure and high temperature.

According to the present disclosure, when using a solid electrolyte sheet including a solid electrolyte slurry coated on an ironically conductive carrier film, the applicant has found that it is possible to prevent a yield decrease resulting from a short-circuit of the all-solid battery and to form an electrolyte layer as a thin film. The present disclosure has been completed based on this finding.

The solid electrolyte sheet for all-solid batteries according to one aspect of the present disclosure has a carrier film including poly (methyl methacrylate) and an ionic conductive material. The solid electrolyte sheet also has a solid electrolyte slurry coated on the carrier film.

Figure 2:
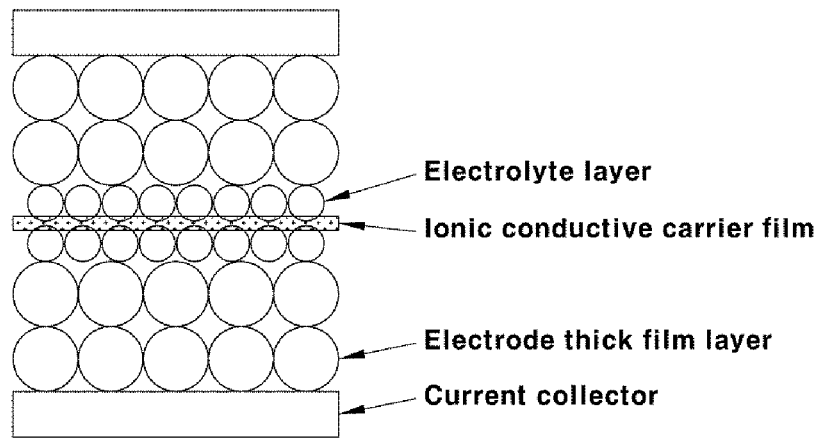
FIG. 2 shows a solid electrolyte layer impregnated with an ionic conductive material and forming a high-density electrolyte layer when drying an all-solid battery manufactured according to one embodiment of the present disclosure at high pressure and high temperature.
Figure 2:
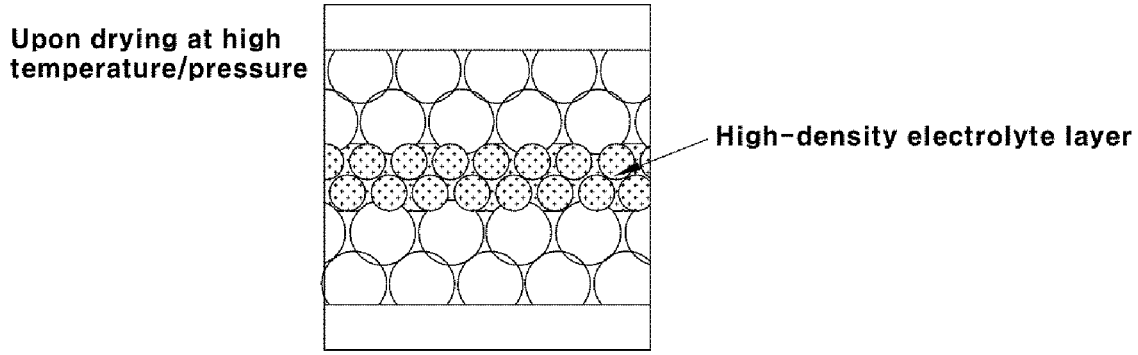

According to the present disclosure, the carrier film, which includes poly (methyl methacrylate) and an ionic conductive material, serves as a support layer of the solid electrolyte slurry and serves to melt upon drying at high temperature and high pressure in the manufacture of the all-solid battery to impart high density to the solid electrolyte layer. FIG. 2 shows that a solid electrolyte layer is impregnated with an ionic conductive material to form a high-density electrolyte layer when drying the all solid-battery manufactured according to one embodiment of the present disclosure at high pressure and high temperature.

The carrier film may include poly (methyl methacrylate) (PMMA) and an ionic conductive material.

The ionic conductive material may be a compound including $Li_2S$—$P_2S_5$, which in one example may be $Li_6PS_5X$ (X=Cl or Br). The carrier film, which includes such an ionic conductive material and PMMA, is melted when dried at high temperature and high pressure in the manufacture of the all-solid battery to make the solid electrolyte layer highly dense.

Meanwhile, the solid electrolyte sheet according to the present disclosure includes a solid electrolyte slurry coated on the carrier film.

The solid electrolyte slurry may be coated on one or on both surfaces of the carrier film. In one example, the solid electrolyte slurry is coated on both surfaces of the carrier film.

In addition, the solid electrolyte slurry includes a solid electrolyte, a nitrile-butadiene rubber binder, and an organic solvent.

The solid electrolyte may be a sulfide-based solid electrolyte and may be selected from $Li_2S$—$P_2S_5$, $Li_2S$—$SiS_2$, $Li_2S$—$GeS_2$ and $Li_2S$—$B_2S_5$. In one embodiment, the sulfide-based solid electrolyte is $Li_2S$—$P_2S_5$ with high lithium ionic conductivity.

In addition, when the content of the solid electrolyte is less than 40% by weight based on the total weight of the solid electrolyte slurry, it may be impossible to form a dense solid electrolyte layer. When the content exceeds 80% by weight, it may be impossible to manufacture a sheet due to high slurry density.

The nitrile-butadiene rubber (NBR) binder has a polar nitrile group at the molecular lever and as a result has strong oil resistance and thus excellent disperseability.

The content of the nitrile-butadiene rubber binder may be 1 to 5% by weight, based on the total weight of the solid electrolyte slurry. Specifically, when the content of the binder is less than 1% by weight, the density of the solid electrolyte sheet may be deteriorated and, when the content exceeds 5% by weight, the binder may act as an electric resistance, causing deterioration in battery performance.

Meanwhile, the organic solvent used for mixing the solid electrolyte and the binder may include one or more selected from the group consisting of o-xylene, p-xylene, m-xylene, and dodecane. Any organic solvent may be used without limitation so long the solvent does not affect physical properties of the solid electrolyte. In one embodiment, the organic solvent is selected from non-polar solvents described above.

In addition, the solid electrolyte slurry in one embodiment is coated to a thickness of 20 to 40 μm (about 0.0008 to 0.0016 in). When the thickness is less than 20 μm (about 0.0008 in), there may be a problem associated with pinholes. When the thickness exceeds 40 μm (about 0.0016 in), the thick electrolyte may result in problems such as increased resistance and decreased energy density.

Meanwhile, the present disclosure provides a method of manufacturing a solid electrolyte sheet for all-solid batteries including drying the solid electrolyte sheet under heating. The solid electrolyte sheet in one embodiment is dried by heating at a temperature of 50 to 100° C. (122 to 212° F.).

The method of manufacturing an all-solid battery according to another aspect of the present disclosure includes stacking a positive electrode current collector, a positive electrode layer, the solid electrolyte sheet manufactured by the method according to the present disclosure, a negative electrode layer and a negative electrode current collector to produce an all solid battery. The method also includes drying the all solid battery at a pressure of 3 to 7 tons (6,000 to 14,000 psi), and at a temperature of 80 to 120° C. (176 to 248° F.) for 30 minutes to 3 hours.

Figure 3:
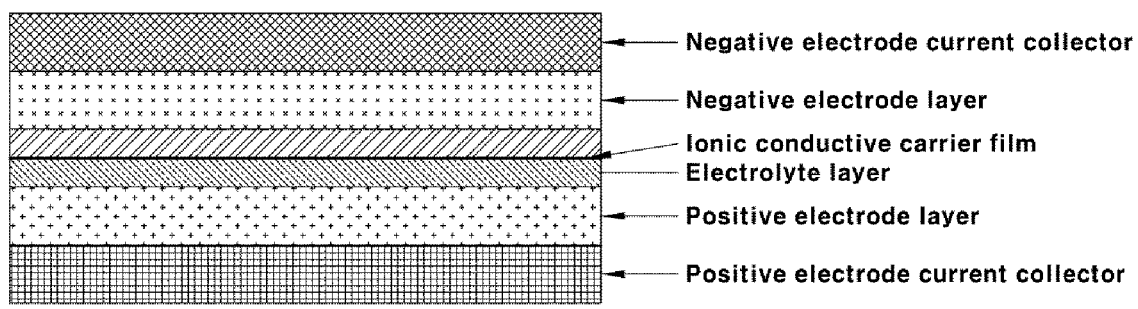
FIG. 3 shows a stack structure of an all-solid battery including the solid electrolyte sheet manufactured according to one embodiment of the present disclosure.

The sheet obtained by heating and drying the solid electrolyte sheet is used to manufacture the all-solid battery. FIG. 3 shows a stack structure of an all-solid battery including the solid electrolyte sheet manufactured according to one embodiment of the present disclosure. The structure of the all-solid battery is formed by sequentially staking the positive electrode current collector, the positive electrode layer, the manufactured solid electrolyte sheet, the negative electrode layer, and the negative electrode current collector. Finally, the all solid battery is completed by drying at high pressure and at high temperature.

In one embodiment, the ionic conductive material of the solid electrolyte sheet is melted by drying at high pressure and high temperature and then impregnated into the solid electrolyte layer, thereby forming a high-density solid electrolyte layer.

The all-solid battery is preferably dried at a pressure of 3 to 7 tons (6,000-14,000 psi) and at a temperature of 80 to 120° C. (176 to 248° F.) for 30 minutes to 3 hours.

Hereinafter, the present disclosure is described in more detail with reference to examples and test examples. However, these examples are provided only for illustration of the present disclosure and should not be construed as limiting the scope of the present disclosure.

Example

One Example of an all-solid battery was manufactured as follows.

First, a positive electrode layer and a negative electrode layer were produced. The positive electrode layer included a nitrile-butadiene rubber or NBR binder and an organic solvent. 1% by weight of NBR, 70% by weight of a positive electrode active material, 2% by weight of a conductive material, and 27% by weight of a solid electrolyte, based on the total weight of the positive electrode slurry, were mixed using a Thinky mixer to produce a slurry. The produced slurry was cast to an Al metal foil and dried at 120° C. (248° F.) to produce the positive electrode layer.

The negative electrode layer included a nitrile-butadiene rubber or NBR binder and an organic solvent. 1% by weight of NBR, 60% by weight of a positive electrode active material, 2% by weight of a conductive material, and 37% by weight of a solid electrolyte, based on the total weight of the positive electrode slurry, were mixed using a Thinky mixer to produce a slurry. The produced slurry was cast onto an Al metal foil and dried at 120° C. (248° F.) to produce the negative electrode layer.

The solid electrolyte slurry was coated to 30 μm (about 0.0012 in) on both surfaces of the carrier film. The carrier film includes poly (methyl methacrylate) and $Li_6PS_5Cl$ to produce a solid electrolyte sheet.

The solid electrolyte slurry included $Li_6PS_5Cl$ as a sulfide-based solid electrolyte, a nitrile-butadiene rubber or NBR binder and an organic solvent. 1% by weight of NBR based on the total weight of the solid electrolyte slurry and 60% by weight of the solid electrolyte based on the total weight of the solid electrolyte slurry were mixed. The solid electrolyte slurry was dried in an oven at 120° C. (248° F.) for 2 hours.

Then, a positive electrode current collector, the positive electrode layer, the dried solid electrolyte sheet, the negative electrode layer, and a negative electrode current collector were sequentially stacked and then dried at a temperature of 120° C. (248° F.) and a pressure of 7 tons (14,000 psi) for 2 hours to produce an all-solid battery having a high-density electrolyte layer.

Meanwhile, a conventional all-solid battery, which included no carrier film, was produced and was then subjected to electrochemical analysis together with the all-solid battery obtained according to the Example. The results are shown in a graph of FIG. 4.

Figure 4:
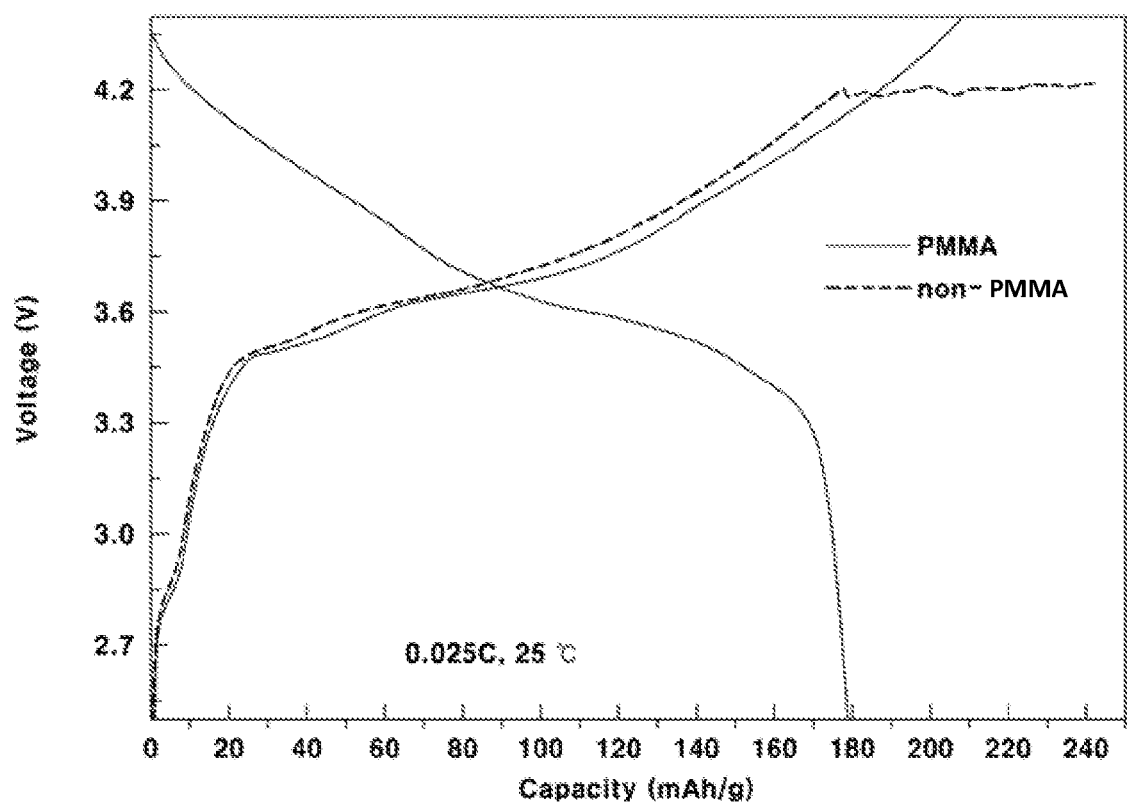
FIG. 4 is a graph showing electrochemical analysis results of an all-solid battery (solid line) including an all-solid sheet according one embodiment of the present disclosure and of a conventional all-solid battery (dotted line).

In FIG. 4, a solid line PMMA represents test results of the all-solid battery produced according to the Example and a dashed line Non-PMMA represents electrochemical analysis results of the conventional all-solid battery.

Advantageously, the solid electrolyte sheet for all-solid batteries and the all-solid battery including the solid electrolyte sheet according to the present disclosure can prevent short-circuiting upon stacking a positive electrode and a negative electrode and thus can prevent yield decrease resulting from a short-circuit of the all-solid battery, and can minimize supernumerary pores due to ionic conductive material incorporated into the solid electrolyte layer to suppress formation of lithium dendrites. Therefore, in FIG. 4, the dashed line non-PMMA represents that the voltage increase during charging does not increase more than a certain level due to the short circuit and confirms that charging is not completed because of the short circuit.

As apparent from the foregoing, the solid electrolyte sheet for all-solid batteries and the all-solid battery including the solid electrolyte sheet according to the present disclosure can realize formation of a solid electrolyte layer as a thin film and can prevent a short-circuit upon stacking a positive electrode and a negative electrode.

Furthermore, the solid electrolyte sheet for all-solid batteries and the all-solid battery including the solid electrolyte sheet can prevent yield decrease resulting from a short-circuit of the all-solid battery and can minimize supernumerary pores due to ionic conductive material incorporated into the solid electrolyte layer to suppress formation of lithium dendrites.

The disclosure has been described in detail with reference to certain embodiments. However, it will be appreciated by those having ordinary skill in the art that changes may be made in the disclosed embodiments without departing from the principles and spirit of the disclosure, the scope of which is defined in the appended claims and their equivalents.

What is claimed is:

1. A solid electrolyte sheet for all-solid batteries, the solid electrolyte sheet comprising:
   a carrier film including poly (methyl methacrylate) and an ionic conductive material; and
   a solid electrolyte layer coated on one or two surfaces of the carrier film,
   wherein the solid electrolyte layer comprises a solid electrolyte and a binder, and a thickness of the solid electrolyte layer ranges from 20 to 40 μm (0.0008 to 0.0016 in).

2. The solid electrolyte sheet according to claim 1, wherein the ionic conductive material is a compound comprising $Li_2S$—$P_2S_5$.

3. The solid electrolyte sheet according to claim 2, wherein the compound comprising $Li_2S$—$P_2S_5$ is $Li_6PS_5X$ (where X=Cl or Br).

4. A method of manufacturing a solid electrolyte sheet for all-solid batteries, the method comprising the steps of:
   preparing a solid electrolyte sheet having a carrier film including poly (methyl methacrylate) and an ionic conductive material and having a solid electrolyte layer coated on one or two surfaces of the carrier film; and drying the solid electrolyte sheet by heating, wherein the solid electrolyte layer comprises a solid electrolyte and a binder, wherein, in the step of preparing, the solid electrolyte layer is coated to a thickness of 20 to 40 µm (0.0008 to 0.0016 in), and wherein the carrier film is melted by heating the solid electrolyte sheet and is impregnated into the solid electrolyte layer.

5. The method according to claim 4, wherein, in the step of preparing, the ionic conductive material is a compound comprising $Li_2S$—$P_2S_5$.

6. The method according to claim 5, wherein, in the step of preparing, the compound comprising $Li_2S$—$P_2S_5$ is $Li_6PS_5X$ (where X=Cl or Br).

7. A method of manufacturing an all-solid battery, the method comprising the steps of:

stacking a positive electrode current collector, a positive electrode layer, a solid electrolyte sheet manufactured by the method of claim 4, a negative electrode layer, and a negative electrode current collector to produce an all-solid battery; and drying the all-solid battery at a pressure of 3 to 7 tons (6,000 to 14,000 psi) and at a temperature of 80 to 120° C. (176 to 248° F.) for 30 minutes to 3 hours.

8. The method according to claim 7, wherein, in the step of stacking, the ionic conductive material of the solid electrolyte sheet is a compound comprising $Li_2S$—$P_2S_5$.

9. The method according to claim 8, wherein, in the step of stacking, the compound comprising $Li_2S$—$P_2S_5$ is $Li_6PS_5X$ (where X=Cl or Br).

10. An all-solid battery comprising a solid electrolyte sheet manufactured by the method of claim 4.

\* \* \* \* \*